United States Patent
Wu (10) Patent No.: US 9,813,378 B2
(45) Date of Patent: Nov. 7, 2017

(54) CUSTOMIZABLE WEB APPLICATION FIREWALL FOR SOFTWARE AS A SERVICE PLATFORM

(71) Applicant: Successfactors, Inc, South San Francisco, CA (US)

(72) Inventor: Yu Wu, Shanghai (CN)

(73) Assignee: Successfactors, Inc., South San Francisco, CA (US)

( * ) Notice: Subject to any disclaimer, the term of this patent is extended or adjusted under 35 U.S.C. 154(b) by 0 days.

(21) Appl. No.: 14/559,937

(22) Filed: Dec. 4, 2014

(65) Prior Publication Data

US 2016/0164837 A1 Jun. 9, 2016

(51) Int. Cl.
*H04L 29/06* (2006.01)
*H04L 29/08* (2006.01)

(52) U.S. Cl.
CPC ...... *H04L 63/0263* (2013.01); *H04L 63/0245* (2013.01); *H04L 63/1483* (2013.01); *H04L 67/02* (2013.01)

(58) Field of Classification Search
CPC . H04L 63/02; H04L 63/0227; H04L 63/0263; H04L 63/1408; H04L 67/02; H04L 67/10; H04L 63/0245; H04L 63/1483

USPC ........................................................ 726/11
See application file for complete search history.

(56) References Cited

U.S. PATENT DOCUMENTS

| | | | |
|---|---|---|---|
| 8,856,869 B1 * | 10/2014 | Brinskelle | H04L 63/08 726/12 |
| 8,904,511 B1 * | 12/2014 | O'Neill | H04L 63/0263 709/223 |
| 2007/0136802 A1 * | 6/2007 | Matoba | H04L 63/0245 726/11 |
| 2010/0199345 A1 * | 8/2010 | Nadir | H04L 63/02 726/11 |

* cited by examiner

*Primary Examiner* — Yogesh Paliwal
(74) *Attorney, Agent, or Firm* — Fountainhead Law Group P.C.

(57) ABSTRACT

Disclosed herein are technologies for implementing a web application firewall specific to tenants, and providing different security rules that are particular to the tenants. In accordance with one implementation, authentication instructions as to one or more tenants may be received and the one or more tenants may be registered. Rules associated to and specific to each of the one or more tenants may further be identified and implemented.

20 Claims, 5 Drawing Sheets

CUSTOMIZABLE WEB APPLICATION FIREWALL FOR SOFTWARE AS A SERVICE PLATFORM

TECHNICAL FIELD

The present disclosure relates generally to a method of implementing customized firewalls for clients.

BACKGROUND

A web application firewall or WAF may be software, hardware, firmware, or combination that may serve as an appliance, server "plugin", or filter. A WAF may be implemented over one or more devices. WAFs are used to apply a set of rules to a conversation or transaction, such as a hypertext transfer protocol or HTTP conversation. Examples of a WAF's use includes preventing attacks (i.e., web attacks), such as cross-site scripting, SQL injection, and the like.

A WAF may be implemented with various platforms, including what is known as a Software as a Service or SaaS platform. A SaaS platform may be used in cloud computing. Typical WAFs implemented on such platforms may have several shortcomings. A platform, such as SaaS, serves multiple tenants or clients. When a WAF is applied, all tenants or clients that are part of or within the environment are protected with the same rules. However, the same rules may not all apply to all tenants or clients. Because different tenants may contain different types of data and feature usages, one rule that works for a tenant may not work well for other tenants or clients. Applying the same rules may lead to issues or problems such as a high rate of false positives that may falsely block normal or expected traffic.

There may be difficulty in applying customized rules to all tenants or clients. Function impact for a WAF or WAFs may not controllable. It may not be possible to selectively turn a rule on/off for a specific tenant or client. In addition, prevention action may not be customizable. For a specific attack, it may not be possible to define a different option for different tenants. This limits the usability of the WAF. Compromises may have to be made, such as the inability to run in active mode in a production environment. For example, implementations using particular software applications may have to run in passive mode. Running in passive mode may not block traffic, defeating the purpose of a firewall.

SUMMARY

Disclosed herein are technologies for a customizable web application firewall or WAF that allows tenants or clients to apply different rules (e.g., security rules). The rules may be selectively turned on or off based on the tenant or client. The rules may be customized based on a tenant's data usage. In accordance with one implementation, authentication instructions as to one or more tenants may be received and the one or more tenants may be registered. Rules associated to and specific to each of the one or more tenants may further be identified and implemented.

With these and other advantages and features that will become hereinafter apparent, further information may be obtained by reference to the following detailed description and appended claims, and to the figures attached hereto.

BRIEF DESCRIPTION OF THE DRAWINGS

The Detailed Description references the accompanying figures. In the figures, the left-most digit(s) of a reference number identifies the figure in which the reference number first appears. The same numbers are used throughout the drawings to reference like features and components.

DETAILED DESCRIPTION

Disclosed herein are technologies for implementing web application firewalls (WAF) shared by various tenants or clients, and providing tenant or client specific rules implemented by the WAF.

Figure 1:
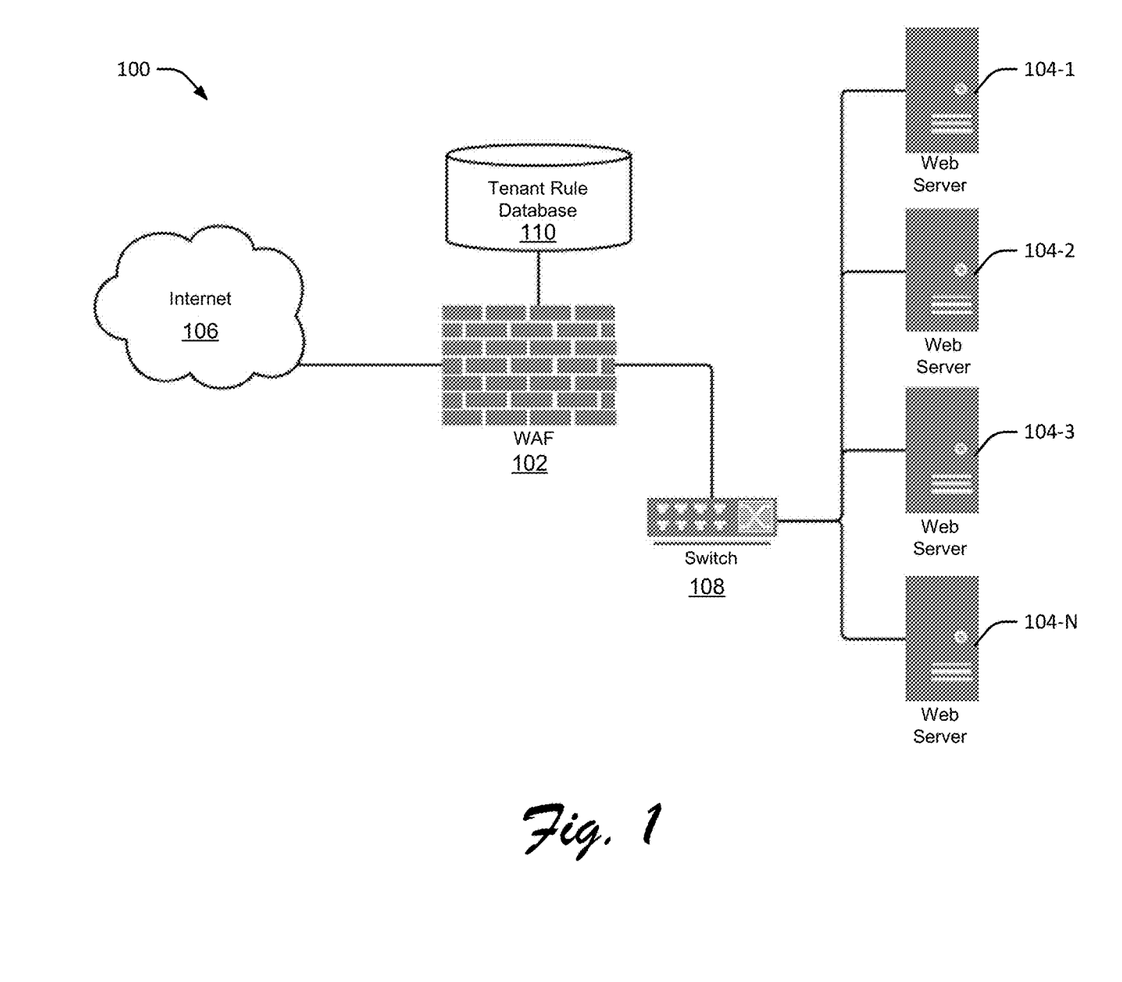
FIG. 1 illustrates an exemplary network or system.

FIG. 1 shows an example network or system 100 as described in the present implementations herein. It is to be understood, that system 100 may include other devices, components, entities and the like such as load balancers, other firewalls, etc.; however, to simplify the description, such items are not shown.

System 100 includes a web application firewall or WAF 102. It is to be understood that WAF 102 may be one or a plurality of devices. Furthermore, WAF 102 may be implemented as a hardware device, software component, firmware, or combination thereof. In addition, the WAF 102 may be implemented over several devices or entities.

The WAF 102 is connected to various servers 104. Servers 104 represent various tenants or clients. Such tenants or clients rely on WAF 102 to control communication or traffic that is provided to the tenants or clients. Such communication or traffic may be received from an external network, such as the Internet 106. WAF 102 may directly or indirectly connect to the Internet 106 or other external networks and is located between such networks and the servers 104.

A switch 108 may be implemented to connect WAF 102 to the various web servers 104. The switch 108 may be implemented as a hardware device, software component, firmware, or combination thereof, and may include one or more devices.

A tenant rule database 110 is connected to the WAF 102. The tenant rule database 110 may include one or more particular databases. In particular the tenant rule database 110 is provided to store rules that may be general and/or specific to the tenants or clients. The rules may include generic rules which are default rules for all tenants or clients. Generic rules may be customized with tenant specific settings. The rules may also include tenant rules that are unique to a specific tenant or client. Tenant rules may be either from the generic rules with customized settings or brand new rules added by tenants or clients (i.e., customers).

In this implementation, the WAF 102 may be deployed as a reverse proxy, such that all external traffic (e.g., HTTP traffic) goes through the WAF 102 first. Tenant or client information, and security rules, may be registered and stored in the tenant rule database 110.

Tenant information is used to identify a tenant associated with a request, such as a HTTP request. Tenant information may be registered manually or through a web service application program interface or API. This process is further described in the discussion below related to tenant or client mapping setup.

The WAF 102 may inspect the incoming and outgoing traffic (e.g., HTTP traffic) based on the configured security rules. If a malicious attack is identified, the WAF 102 may take appropriate action.

Tenant or client mapping setup allows the ability to identify a tenant(s) associated with particular requests, such as an HTTP request. Tenant or client mapping setup allows users (i.e., tenants or clients) to configure the mapping manually or through a web service API.

Four different architecture types of a tenant or client common platform, such as Software as a Service or SaaS platform may be addressed. The example architecture types may include Authentication, URL Path, Sub Domain, and Custom Domain.

For example, in Authentication, a SaaS based application, such as Success Factors' BizX™ application suite, identifies a tenant or client based on authenticity. An example identifying script may be "business execution software" (BizX) by "Success Factors Business Execution Suite".

Examples to identify a tenant or client for URL Path such as, for example, for two different tenants or clients are the following: https://app.cloudapp.com/tenantA and https://app.cloudapp.com/tenantB.

Examples to identify a tenant or client for Sub Domain such as, for example, for two different tenants or clients are the following: https://tenantA.cloudapp.com/ and https://tenantB.cloudapp.com/.

Examples to identify a tenant or client for Custom Domain such as, for example, for two different tenants or clients are the following: https://app.cloudtenantA.com and https://app.cloudtenantB.com.

In certain implementations, a common platform, such as a SaaS platform using URL Path, Sub Domain, and Custom Domain, tenants or clients (i.e., users), the tenant or client mapping may be registered manually. The following Table 1 is an example registration table.

TABLE 1

| Tenant_ID | Tenant_Type | Pattern |
| --- | --- | --- |
| tenantA | URLPath | /tenantA |
| tenantB | SubDomain | tenantB.cloudapp.com |
| tenantC | CustomDomain | www.tenantC.com |

In certain implementations, a common platform, such as a SaaS platform using Authentication to identify a tenant, the tenant or client mapping may be dynamically registered through a web service application program interface or API.

Figure 2:
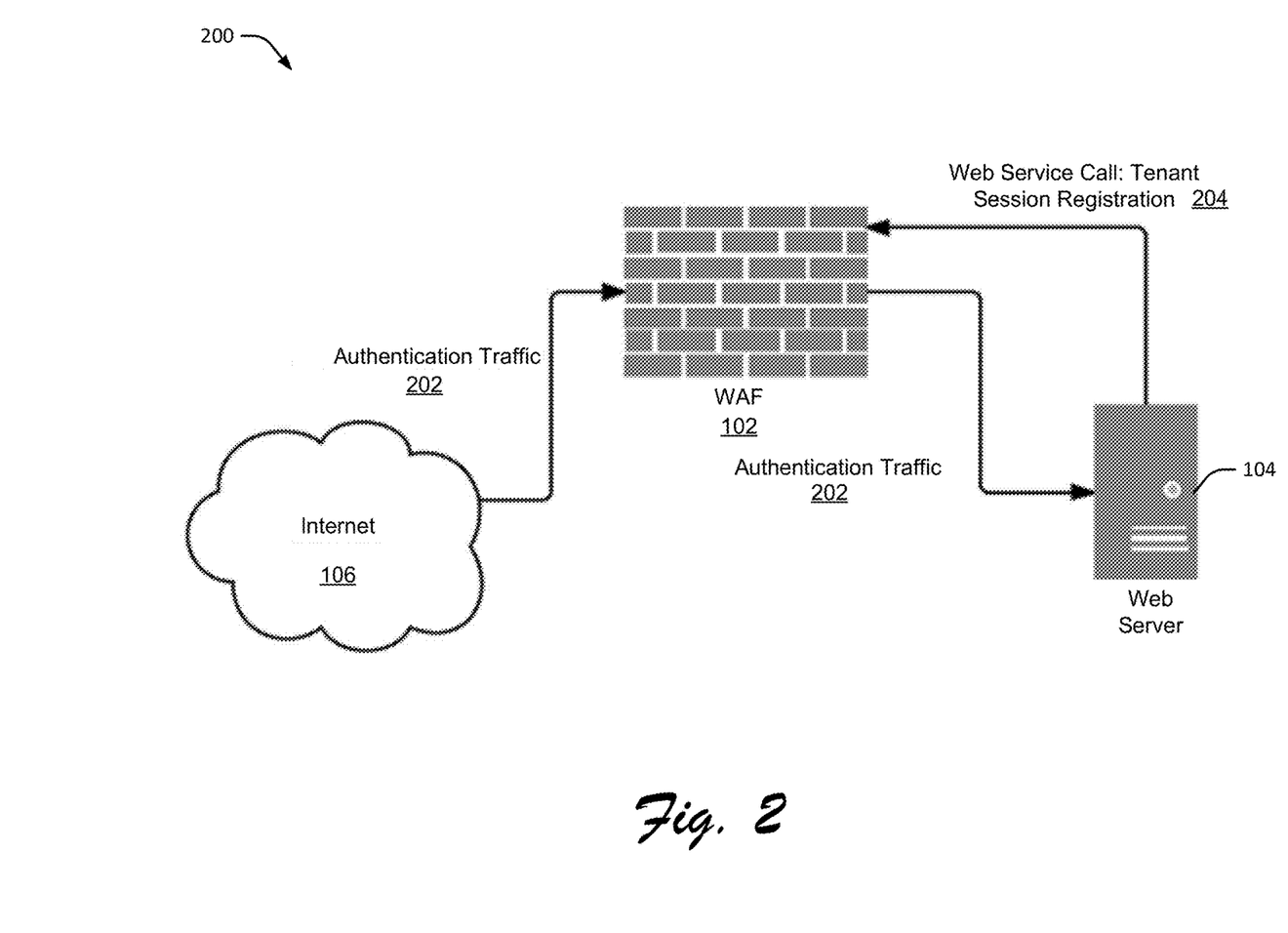
FIG. 2 illustrates an exemplary network or system for tenant or client mapping registration.

FIG. 2 shows an example network or system 200 to identify and dynamically register a tenant or client mapping. The dynamic registration may be performed through a web service API at the web server 104.

Authentication traffic 202 is received from a network or networks, such as the Internet 106. The WAF 102 passes the authentication traffic 202 to a web server 104 supporting a particular tenant or client. In a particular implementation, using a common platform, such as a SaaS platform, the web server 104 uses the SaaS application platform to receive a HTTP request for authentication (i.e., authentication traffic 202).

Once the tenant or client is authenticated, the SaaS platform or application calls a WAF web service API to register tenant HTTP session information to WAF 102. The WAF web service API may be implemented on the web server 104. The call or communication is represented in FIG. 2 as "Web Service Call: Tenant Registration 204." Whenever there is a session renew, the updated HTTP session information should be registered to WAF 102.

The following Table 2 is an example of content that may be registered in WAF 102, as for example registered dynamically with the WAF 102 by a web server 104 supporting a tenant or client.

TABLE 2

| Tenant_ID | Tenant_Type | Pattern |
| --- | --- | --- |
| tenantD | Authentication | JSESSION = 04356F01B483A7C21 CFA32D7EBBF9316 |

Figure 3:
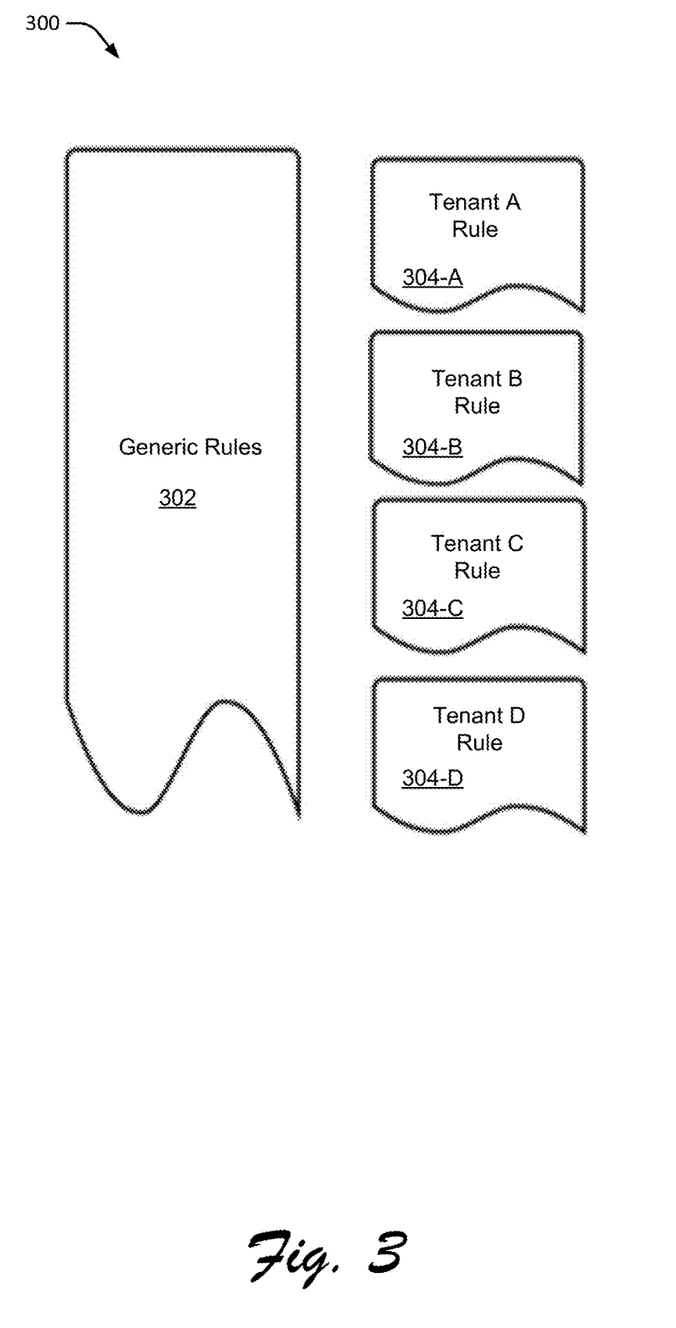
FIG. 3 illustrates an exemplary tenant or client rule mapping.

FIG. 3 shows an example tenant or client rule mapping as described in present implementations herein. The WAF 102 may register such rules and store the rules in tenant rule database 110 as describe above. Specific rules may be applied to specific tenants or clients. Rules may include security rules. The rules may be selectively turned on or off base on the tenant or client. The rules may be customized based on a tenant's data usage. Prevention rules may be based on the tenant or client.

Generic rules 302 may be considered as default rules for all tenants or clients. Generic rules 302 may be customized with tenant or client specific settings. Different tenants or clients may have their own specific tenant rule(s) 304. Tenant or client rules 304 are unique to a specific tenant. Tenant or client rules 304 may be generic rules 302 with customized settings, or rules that are added by users (i.e. tenants or clients).

Figure 4:
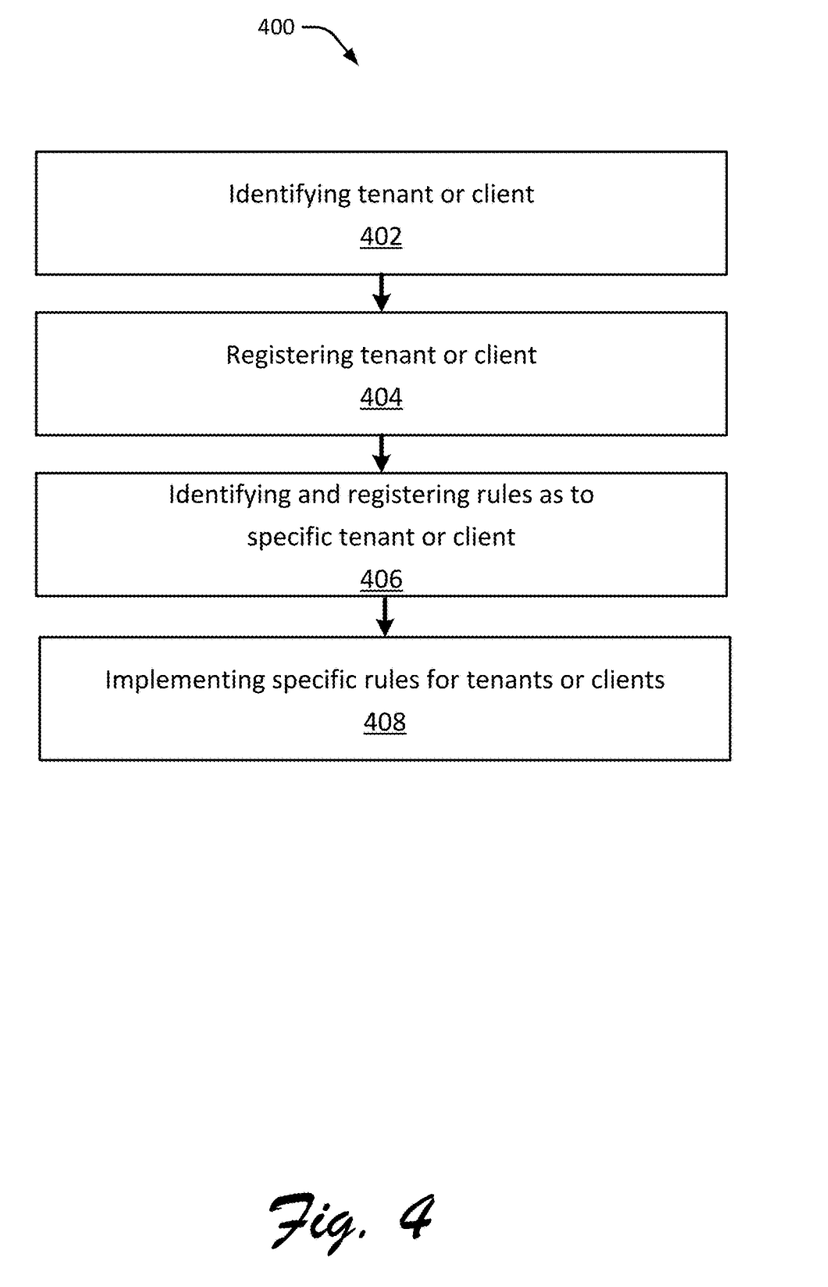
FIG. 4 illustrates an exemplary process.

FIG. 4 illustrates an exemplary process 400 for implementing, at least in part, the technology described herein. In particular, process 400 depicts a flow to customized tenant rules through a common web application firewall or WAF. The process 400 may be performed by a computing device or devices. An example architecture of such a computer device is described below with reference to FIG. 5. In this particular example, the process 400 describes that certain acts are performed by a system.

At 402, a tenant or client may be authenticated. The tenant or client is part of multiple tenants and clients that use the WAF. In particular, such tenants and clients implement a common platform, such as SaaS platform.

At 404, the tenant or client is registered. Registration may be performed by a tenant or client setup configured manually or automatically.

At 406, specific rules as to specific tenants or clients are identified and registered. The rules may be generic rules or specific rules. Such rules may be located in a rules database.

At 408, the specific rules are implemented for the particular tenants or clients. In particular, the WAF may implement such rules.

Figure 5:
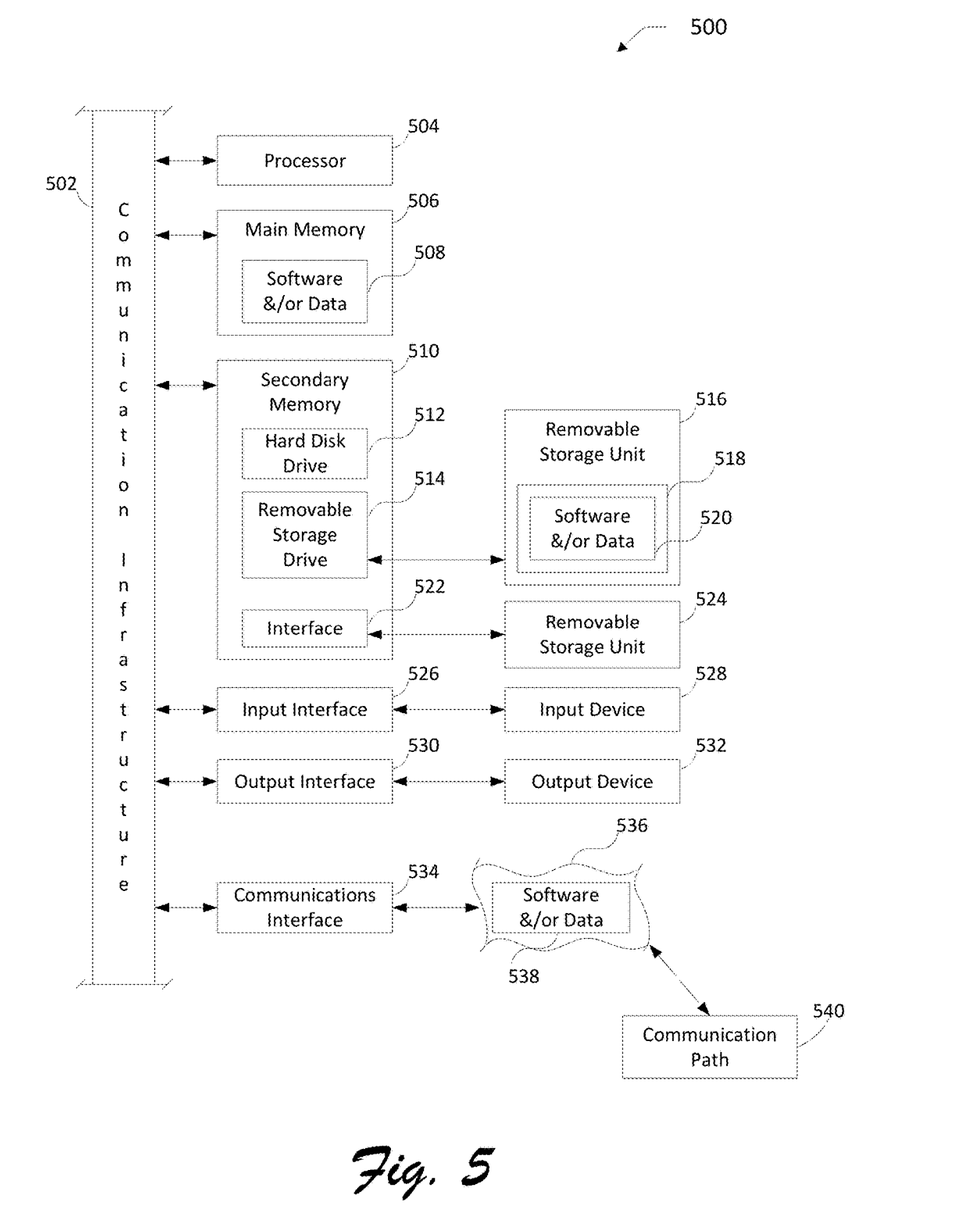
FIG. 5 illustrates an exemplary computing system.

FIG. 5 illustrates an exemplary system 500 that may implement, at least in part, the technologies described herein. The computer system 500 includes one or more processors, such as processor 504. Processor 504 can be a special-purpose processor or a general-purpose processor. Processor 504 is connected to a communication infrastructure 502 (for example, a bus or a network). Depending upon the context, the computer system 500 may also be called a client device.

Computer system 500 also includes a main memory 506, preferably Random Access Memory (RAM), containing possibly inter alia computer software and/or data 508.

Computer system 500 may also include a secondary memory 510. Secondary memory 510 may include, for example, a hard disk drive 512, a removable storage drive 514, a memory stick, etc. A removable storage drive 514 may comprise a floppy disk drive, a magnetic tape drive, an optical disk drive, a flash memory, or the like. A removable storage drive 514 reads from and/or writes to a removable storage unit 516 in a well-known manner. A removable storage unit 516 may comprise a floppy disk, a magnetic tape, an optical disk, etc. which is read by and written to by removable storage drive 514. As will be appreciated by persons skilled in the relevant art(s) removable storage unit 516 includes a computer usable storage medium 518 having stored therein possibly inter alia computer software and/or data 520.

In alternative implementations, secondary memory 510 may include other similar means for allowing computer programs or other instructions to be loaded into computer system 500. Such means may include, for example, a removable storage unit 524 and an interface 522. Examples of such means may include a program cartridge and cartridge interface (such as that found in video game devices), a removable memory chip (such as an Erasable Programmable Read-Only Memory (EPROM), or Programmable Read-Only Memory (PROM)) and associated socket, and other removable storage units 524 and interfaces 522 which allow software and data to be transferred from the removable storage unit 524 to computer system 500.

Computer system 500 may also include an input interface 526 and a range of input devices 528 such as, possibly inter alia, a keyboard, a mouse, etc.

Computer system 500 may also include an output interface 530 and a range of output devices 532 such as, possibly inter alia, a display, one or more speakers, etc.

Computer system 500 may also include a communications interface 534. Communications interface 534 allows software and/or data 538 to be transferred between computer system 500 and external devices. Communications interface 534 may include a modem, a network interface (such as an Ethernet card), a communications port, a Personal Computer Memory Card International Association (PCMCIA) slot and card, or the like. Software and/or data 538 transferred via communications interface 534 are in the form of signals 536 which may be electronic, electromagnetic, optical, or other signals capable of being received by communications 534. These signals 536 are provided to communications interface 534 via a communications path 540. Communications path 540 carries signals and may be implemented using a wire or cable, fiber optics, a phone line, a cellular phone link, a Radio Frequency (RF) link or other communication channels.

As used in this document, the terms "computer-program medium," "computer-usable medium," and "computer-readable medium" generally refer to media such as removable storage unit 516, removable storage unit 524, and a hard disk installed in hard disk drive 512. Computer program medium and computer usable medium can also refer to memories, such as main memory 506 and secondary memory 510, which can be memory semiconductors (e.g. Dynamic Random Access Memory (DRAM) elements, etc.). These computer program products are means for providing software to computer system 500.

Computer programs (also called computer control logic) are stored in main memory 506 and/or secondary memory 510. Such computer programs, when executed, enable computer system 500 to implement the present technology described herein. In particular, the computer programs, when executed, enable processor 504 to implement the processes of aspects of the above. Accordingly, such computer programs represent controllers of the computer system 500. Where the technology described herein is implemented, at least in part, using software, the software may be stored in a computer program product and loaded into computer system 500 using removable storage drive 514, interface 522, hard disk drive 512 or communications interface 534.

The technology described herein may be implemented as computer program products comprising software stored on any computer useable medium. Such software, when executed in one or more data processing devices, causes data processing device(s) to operate as described herein. Embodiments of the technology described herein may employ any computer useable or readable medium, known now or in the future. Examples of computer useable mediums include, but are not limited to, primary storage devices (e.g., any type of random access memory), secondary storage devices (e.g., hard drives, floppy disks, Compact Disc Read-Only Memory (CD-ROM) disks, Zip disks, tapes, magnetic storage devices, optical storage devices, Microelectromechanical Systems (MEMS), and nanotechnological storage device, etc.).

A computing system may take the form of any combination of one or more of inter alia a wired device, a wireless device, a mobile phone, a feature phone, a smartphone, a tablet computer (such as for example an iPad™), a mobile computer, a handheld computer, a desktop computer, a laptop computer, a server computer, an in-vehicle (e.g., audio, navigation, etc.) device, an in-appliance device, a Personal Digital Assistant (PDA), a game console, a Digital Video Recorder (DVR) or Personal Video Recorder (PVR), a cable system or other set-top-box, an entertainment system component such as a television set, etc.

In the above description of exemplary implementations, for purposes of explanation, specific numbers, materials configurations, and other details are set forth in order to better explain the present invention, as claimed. However, it will be apparent to one skilled in the art that the claimed invention may be practiced using different details than the exemplary ones described herein. In other instances, well-known features are omitted or simplified to clarify the description of the exemplary implementations.

The inventor intends the described exemplary implementations to be primarily examples. The inventor does not intend these exemplary implementations to limit the scope of the appended claims. Rather, the inventor has contemplated that the claimed invention might also be embodied and implemented in other ways, in conjunction with other present or future technologies.

Moreover, the word "exemplary" is used herein to mean serving as an example, instance, or illustration. Any aspect or design described herein as exemplary is not necessarily to be construed as preferred or advantageous over other aspects or designs. Rather, use of the word "exemplary" is intended to present concepts and techniques in a concrete fashion. The term "technology," for instance, may refer to one or more devices, apparatuses, systems, methods, articles of manufacture, and/or computer-readable instructions as indicated by the context described herein.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form.

Note that the order in which the processes are described is not intended to be construed as a limitation, and any number of the described process blocks can be combined in any order to implement the processes or an alternate process. Additionally, individual blocks may be deleted from the processes without departing from the spirit and scope of the subject matter described herein.

One or more embodiments described herein may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

What is claimed is:

1. A method implemented at a web application firewall, comprising:
   providing generic rules applicable to all tenants;
   authenticating one or more tenants;
   registering tenant information of the one or more tenants, including mapping a pattern with a tenant type and a tenant identifier, wherein the tenant type comprises a uniform resource locator (URL) path, Sub Domain or Custom Domain;
   identifying, based on the tenant information, at least one of the one or more tenants which is associated with a hypertext transfer protocol (HTTP) request;
   identifying rules associated to and specific to each of the one or more identified tenants, wherein identifying the rules including customizing at least one of the generic rules based on data usage of at least one of the one or more identified tenants; and
   implementing the identified rules associated to and specific to each of the one or more identified tenants.

2. The method of claim 1, wherein the one or more identified tenants implement a common platform.

3. The method of claim 1, wherein the authenticating the one or more tenants is performed by access to an external network.

4. The method of claim 1, wherein the authenticating the one or more tenants is performed by a request performed by a source external to the one or more tenants, and received and communicated through the web application firewall.

5. The method of claim 1, wherein the pattern comprises a hypertext transfer protocol (HTTP) request pattern.

6. The method of claim 1, wherein mapping the pattern with the tenant type and the tenant identifier is performed manually or automatically through a web service application program interface (API).

7. The method of claim 1, wherein the identified rules associated to and specific to each of the one or more identified tenants include the generic rules applicable to all tenants and specific rules particular to specific tenants.

8. The method of claim 1, wherein the implementing the identified rules is performed through one or more rules databases.

9. A web application firewall, comprising:
   one or more processors; and
   memory configured to:
      provide generic rules applicable to all tenants;
      access one or more tenants,
      register tenant information of the one or more tenants, including mapping a pattern with a tenant type and a tenant identifier, wherein the tenant type comprises a uniform resource locator (URL) path, Sub Domain or Custom Domain,
      identify, based on the tenant information, at least one of the one or more tenants which is associated with a hypertext transfer protocol (HTTP) request,
      register rules associated to and specific to each of the one or more identified tenants, wherein the rules that are specific to each of the one or more identified tenants comprise the generic rules customized based on data usage of the one or more identified tenants, and
      implement the rules that are associated to and specific to the one or more identified tenants.

10. The web application firewall of claim 9, wherein the web application firewall and the one or more identified tenants implement a common platform.

11. The web application firewall of claim 9, wherein the web application firewall is configured to one or more databases that store the generic rules and customized rules associated and specific to each of the one or more identified tenants.

12. The web application firewall of claim 9, wherein the web application firewall is configured to receive authentication requests to register the one or more identified tenants.

13. The web application firewall of claim 9, wherein the web application firewall registers the rules through an application program interface (API) resident on a web server supporting a specific tenant.

14. The web application firewall of claim 9, wherein the web application firewall registers the rules by instructions provided by the one or more identified tenants, the instructions are specific to a tenant.

15. One or more non-transitory computer-readable media storing processor-executable instructions that when executed cause one or more processors to perform operations comprising:
   providing generic rules applicable to all tenants;
   receiving authentication instructions as to one or more tenants;
   registering tenant information of the one or more tenants, including mapping a pattern with a tenant type and a tenant identifier, wherein the tenant type comprises a uniform resource locator (URL) path, Sub Domain or Custom Domain;
   identifying, based on the tenant information, at least one of the one or more tenants which is associated with a hypertext transfer protocol (HTTP) request;
   registering HTTP session information associated with the one or more identified tenants;
   identifying generic rules applicable to all the tenants and rules specific to each of the one or more identified tenants, wherein identifying rules specific to each of the one or more identified tenants comprises customizing at least one of the generic rules based on data usage of at least one of the one or more identified tenants; and implementing the identified generic and specific rules.

16. The one or more computer-readable media of claim 15, wherein the receiving the authentication instructions is communicated through authentication requests from external sources of the one or more identified tenants.

17. The one or more computer-readable media of claim 15, wherein the pattern comprises a hypertext transfer protocol (HTTP) request pattern.

18. The one or more computer-readable media of claim 15, wherein the mapping is dynamically performed through an application program interface.

19. The one or more computer-readable media of claim 15, wherein the implementing the identified generic and specific rules is performed through one or more rules databases.

20. The one or more computer-readable media of claim 15, wherein the implementing the identified generic and specific rules is performed with communication to an external network or networks.

\* \* \* \* \*